(12) United States Patent
Kuwabara et al.

(10) Patent No.: US 9,849,743 B2
(45) Date of Patent: Dec. 26, 2017

(54) SWING ARM

(71) Applicant: HONDA MOTOR CO., LTD., Tokyo (JP)

(72) Inventors: Naoki Kuwabara, Wako (JP); Hiroaki Tomita, Wako (JP); Hajime Uchiyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 43 days.

(21) Appl. No.: 14/831,253

(22) Filed: Aug. 20, 2015

(65) Prior Publication Data
US 2016/0089944 A1   Mar. 31, 2016

(30) Foreign Application Priority Data

Sep. 25, 2014  (JP) ................. 2014-195272

(51) Int. Cl.
*B60G 7/00* (2006.01)
*B60G 3/20* (2006.01)

(52) U.S. Cl.
CPC .............. *B60G 7/001* (2013.01); *B60G 3/20* (2013.01); *B60G 2200/144* (2013.01); *B60G 2204/4308* (2013.01); *B60G 2206/121* (2013.01); *B60G 2206/8103* (2013.01); *B60G 2206/8201* (2013.01); *B60G 2300/07* (2013.01); *B60G 2300/124* (2013.01)

(58) Field of Classification Search
CPC . B60G 7/001; B60G 3/20; B60G 5/04; B60G 5/043; B60G 2204/1224; B60G 2206/012; B60G 2206/0122; B60G 2206/121; B60G 2206/124; B60G 2206/16; B60G 2206/161

USPC .......... 280/124, 134, 135, 124.137
See application file for complete search history.

(56) References Cited

U.S. PATENT DOCUMENTS

| | | | | |
|---|---|---|---|---|
| 4,170,373 A | * | 10/1979 | Beck ...................... | B60G 7/001 280/124.141 |
| 4,635,957 A | * | 1/1987 | Merkle ................... | B60G 3/20 280/124.136 |
| 5,240,278 A | * | 8/1993 | Nelms ................... | B60G 15/063 280/124.141 |
| 6,357,543 B1 | * | 3/2002 | Karpik .................. | B60G 3/20 180/182 |

(Continued)

FOREIGN PATENT DOCUMENTS

JP   2010-064568   3/2010

*Primary Examiner* — Barry Gooden, Jr.
(74) *Attorney, Agent, or Firm* — Rankin, Hill & Clark LLP

(57) ABSTRACT

A swing arm having a reduced number of parts in which manufacturing cost can be reduced. In a swing arm including: vehicle-body-side support portions that are supported on a vehicle body side by a first rotary shaft; wheel-side support portions that are supported on a wheel side by a second rotary shaft; and a pair of arm portions that connect the vehicle-body-side support portions and the wheel-side support portions to each other, cross members that extend in an axial direction of the first rotary shaft is arranged on the pair of arm portions so as to extend between the pair of arm portions, and the cross members have a U shape in cross section orthogonal to a longitudinal direction of the cross members, thus forming opening portions that open so as to face a direction that the pair of arm portions extends.

12 Claims, 7 Drawing Sheets

(56) References Cited

U.S. PATENT DOCUMENTS

| | | | | |
|---|---|---|---|---|
| 2002/0125675 | A1* | 9/2002 | Clements | B60G 17/0162 280/124.152 |
| 2005/0110235 | A1* | 5/2005 | LeBlanc, Sr. | B60G 3/20 280/124.135 |
| 2005/0212244 | A1* | 9/2005 | Bobbitt | B60G 7/003 280/86.751 |
| 2007/0069494 | A1* | 3/2007 | Kinjyo | B60G 21/055 280/124.106 |
| 2007/0090621 | A1* | 4/2007 | Vigen | B60G 3/20 280/124.134 |
| 2007/0090622 | A1* | 4/2007 | Reineck | B60G 9/027 280/124.152 |
| 2007/0170682 | A1* | 7/2007 | Kinugasa | B60G 3/20 280/124.135 |
| 2007/0176387 | A1* | 8/2007 | Tsuruta | B60G 3/20 280/124.135 |
| 2009/0184484 | A1* | 7/2009 | Gerrard | B60G 3/10 280/124.144 |
| 2010/0059945 | A1* | 3/2010 | Kuwabara | B60G 7/001 280/29 |
| 2011/0025012 | A1* | 2/2011 | Nakamura | B60G 3/20 280/124.135 |
| 2012/0326410 | A1* | 12/2012 | West | B60G 3/20 280/124.109 |
| 2013/0049318 | A1* | 2/2013 | Kwon | B60G 3/20 280/124.139 |
| 2013/0093154 | A1* | 4/2013 | Cordier | B60G 3/20 280/124.109 |
| 2016/0089945 | A1* | 3/2016 | Kuwabara | B60G 7/001 280/124.117 |

* cited by examiner

SWING ARM

BACKGROUND OF THE INVENTION

Field of the Invention

The present invention relates to a swing arm.

Description of Related Art

Conventionally, for example, as a swing arm which includes a pair of arm portions for connecting a vehicle body side and a wheel side to each other, there has been known a swing arm disclosed in JP-A-2010-64568. Such a swing arm is formed by combining pipe members and plate-like members that are formed into predetermined shapes, respectively.

In forming the swing arm by combining the plurality of members, parts which can be used in common by left and right swing arms and parts which cannot be used in common by the left and right swing arms (parts for forming the left swing arm and parts for forming right swing arm being formed separately) coexist. Accordingly, there has been a demand for the swing arm where parts can be used in common by left and right swing arms as much as possible.

SUMMARY OF THE INVENTION

In view of the above, it is an object of the invention to provide a swing arm in which the number of parts can be reduced and a manufacturing cost can be reduced.

In accordance with one aspect of the present invention, a swing arm includes: a vehicle-body-side support portion, which is supported on a vehicle body side by a first rotary shaft; a wheel-side support portion, which is supported on a wheel side by a second rotary shaft; and a pair of arm portions, which connect the vehicle-body-side support portion and the wheel-side support portion to each other, wherein a cross member that extends in an axial direction of the first rotary shaft is arranged on the pair of arm portions so as to extend between the pair of arm portions, and the cross member has a U shape in cross section orthogonal to a longitudinal direction of the cross member thus forming an opening portion that opens so as to face a direction that the pair of arm portions extends.

According to this aspect of the invention, the cross member that extends in the axial direction of the first rotary shaft is arranged so as to extend between the pair of arm portions, the cross member has a U shape in cross section orthogonal to the longitudinal direction of the cross member, and opens so as to face the direction that the pair of arm portions extends. Accordingly, the cross member can be formed into a symmetrical shape using a predetermined center line as an axis of symmetry. With such a configuration, when the swing arm is arranged on both the left and the right sides, the same swing arm can be arranged on both the left and the right sides, respectively, by reversing the same swing arm and hence, the swing arms on both left and right sides can be formed using the same swing arm in common. Accordingly, it becomes unnecessary to prepare the left and right swing arms separately, thus reducing the number of parts and realizing the reduction of a manufacturing cost.

In accordance with another aspect of the invention, the cross member includes: an upper wall and a lower wall that project in the direction that the pair of arm portions extend; and a vertical wall that extends between the upper wall and the lower wall, and a bent portion that has an edge thereof bent toward the vertical wall is formed on the upper wall and the lower wall. By forming the bent portion having the edge thereof bent in the direction toward the vertical wall on the upper wall and the lower wall of the cross member, it is possible to easily form an escape portion for a suspension-group member. For example, the bent portion functions as an escape portion for a cushion unit thus preventing the cross member and the cushion unit from being brought into contact with each other.

In accordance with another aspect of the invention, the cross member is formed by bending a plate material, a flat planar portion is formed on the vertical wall, and a mounting portion for mounting a chassis-group member is formed on the planar portion. By forming the cross member by bending a plate material, the bent portion can be formed by punching the plate material and hence, compared to a case where the cross member is formed by bending a pipe member, man-hours for working can be reduced and a manufacturing cost can be reduced. Further, by forming the flat planar portion on the vertical wall of the cross member, and by forming the mounting portion for a chassis-group member on the planar portion, it becomes unnecessary to additionally provide a bracket or the like for mounting the chassis-group member and hence, the number of parts can be reduced and a manufacturing cost can be reduced. The chassis-group member may be a member in a brake system, a suspension system or a steering system.

In accordance with another aspect of the invention, the cross member has: connecting portions that are connected to the pair of arm portions, and an intermediate portion that is positioned in a middle between the pair of arm portions, and in the cross member, widths of the connecting portions are larger than widths of the intermediate portions. By setting widths of the connecting portions of the cross member larger than a width of the intermediate portion of the cross member, connection margins of the connecting portions with respect to the pair of arm portions can be sufficiently secured and hence, the cross member can be firmly connected to the pair of arm portions whereby it becomes unnecessary to additionally provide a gusset or the like for securing a connection margin. Accordingly, the number of parts can be reduced and a manufacturing cost can be reduced.

In accordance with another aspect of the invention, the pair of arm portions is constituted of the front arm portion and the rear arm portion that are arranged in the longitudinal direction, the cross member is constituted of the vehicle-body-side cross member that is arranged on a vehicle body side and the wheel-side cross member that is arranged on a wheel side, and a front connection distance between the vehicle-body-side cross member and the wheel-side cross member that are connected to the front arm portion is larger than a rear connection distance between the vehicle-body-side cross member and the wheel-side cross member which are connected to the rear arm portion.

Accordingly, a length from the connecting portion of the rear arm portion with the cross member to a support portion can be set larger than a length from the connecting portion of the front arm portion with the cross member to a support portion and hence, the rear arm portion can be deflected while enhancing rigidity of the front arm portion.

In accordance with another aspect of the invention, the mounting portion for the chassis-group member is a through hole to which a stabilizer is mounted. Accordingly, it becomes unnecessary to additionally provide a bracket or the like for mounting the stabilizer and hence, the number of parts can be reduced and a manufacturing cost can be reduced.

BRIEF DESCRIPTION OF THE DRAWINGS

These and further features of the invention will be apparent with reference to the following description and drawings, wherein.

DETAILED DESCRIPTION OF THE INVENTION

Figure 1:
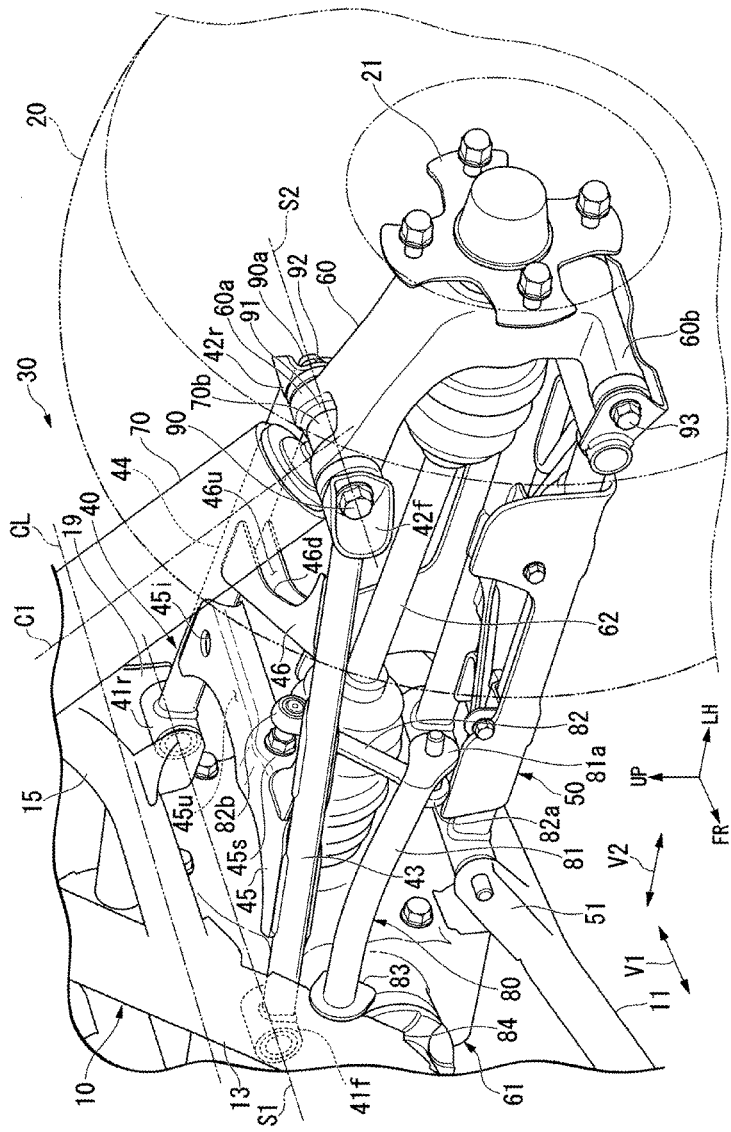
FIG. 1 is a perspective view of a rear suspension according to an embodiment as viewed from an oblique front, upper and left side.

Hereinafter, an embodiment of the invention is explained by reference to drawings. In the explanation made hereinafter, the directions such as "frontward direction", "rearward direction", "leftward direction", "rightward direction" and the like are equal to the directions of a vehicle explained hereinafter unless otherwise specified. In appropriate portions in the drawings used for the explanation made hereinafter, an arrow FR indicative of a front side of the vehicle, an arrow LH indicative of a left side of the vehicle, and an arrow UP indicative of an upper side of the vehicle are described. In the drawings, a line CL indicates a center line of a vehicle body in the lateral direction.

For example, the embodiment of the invention is applicable to a four-wheeled vehicle in which left and right wheels are provided to a front side and a rear side of the vehicle respectively. For example, as the four-wheeled vehicle, a vehicle (MUV: Multi Utility Vehicle) which is designed so as to mainly travel on an irregular terrain such as wasted land can be named.

Firstly, the configuration of a rear suspension 30 according to the embodiment is explained by reference to FIG. 1 to FIG. 4.

Figure 2:
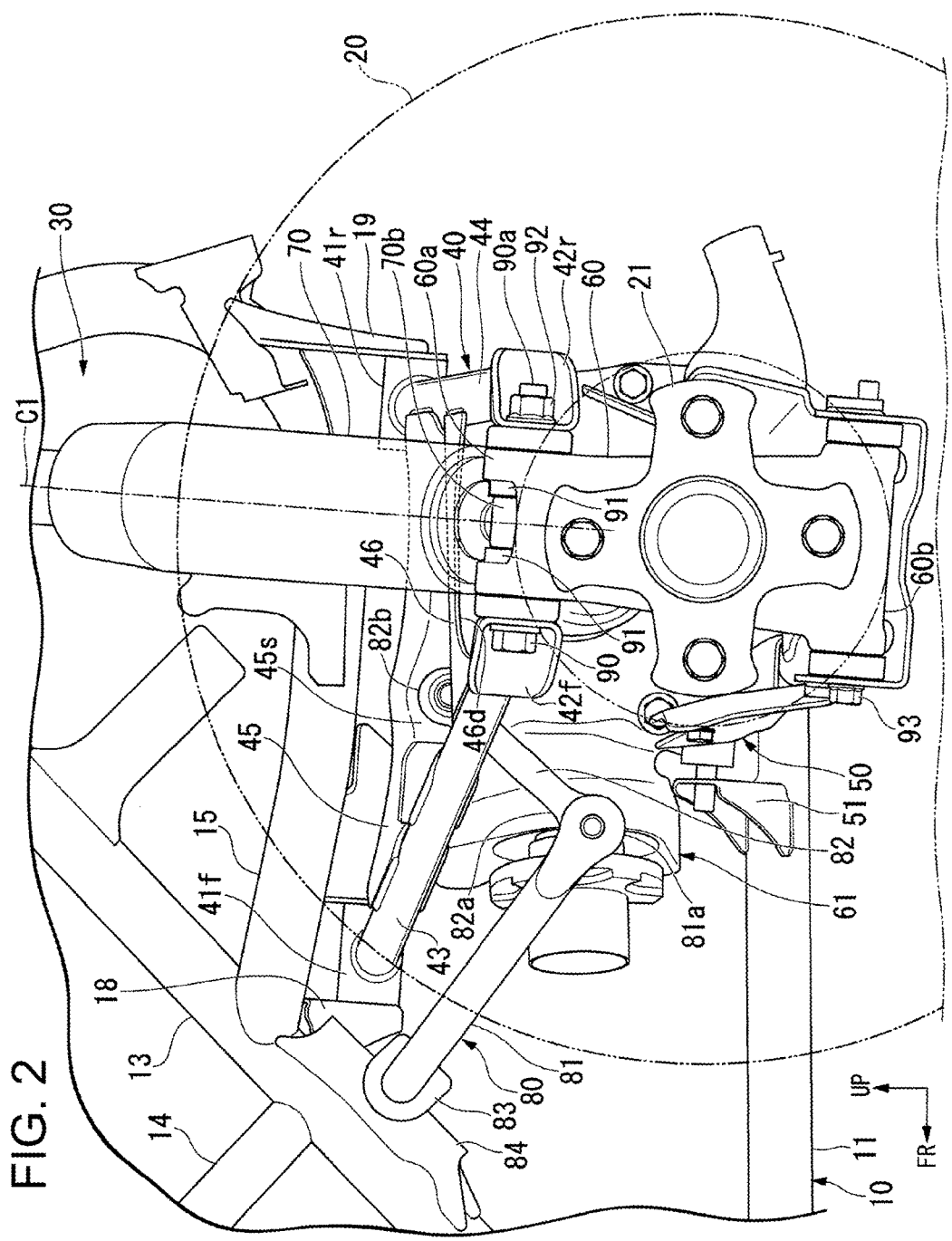
FIG. 2 is a left side view of the rear suspension.
Figure 3:
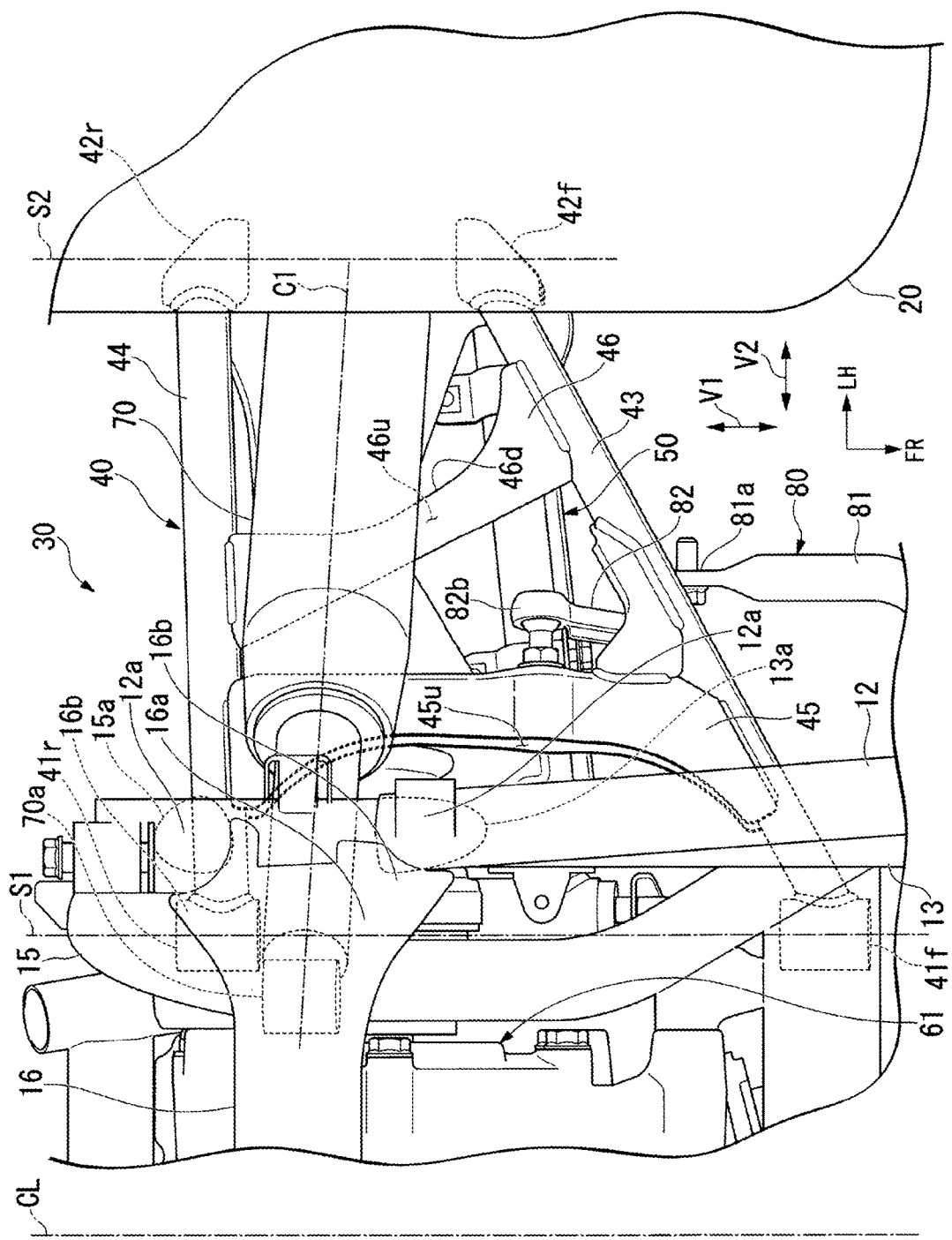
FIG. 3 is a top plan view of the rear suspension.
Figure 4:
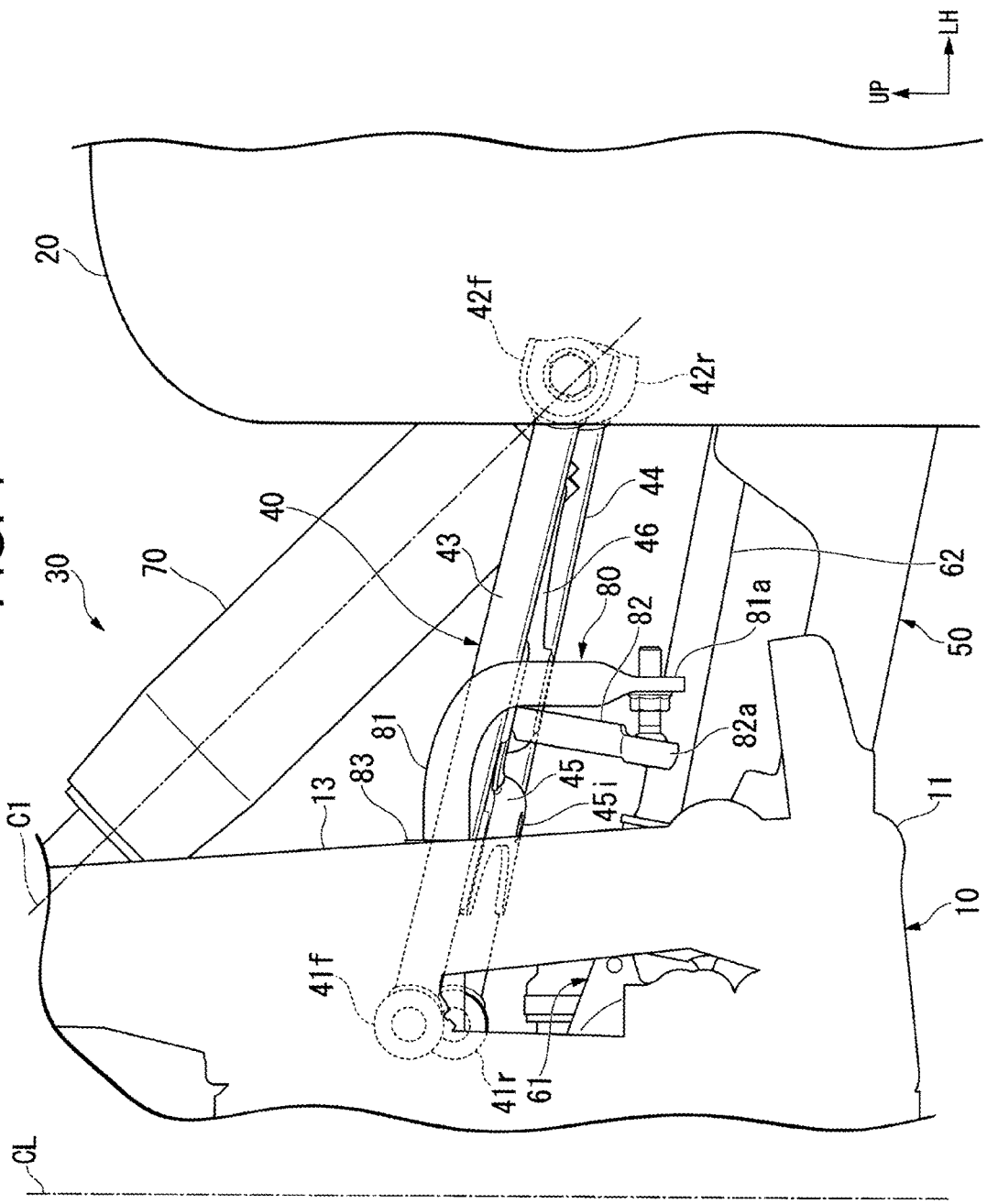
FIG. 4 is a front view of the rear suspension.

FIG. 1 is a perspective view of the rear suspension 30 according to the embodiment as viewed from an oblique left front upper side. FIG. 2 is a left side view of the rear suspension 30. FIG. 3 is a top plan view of the rear suspension 30. FIG. 4 is a front view of the rear suspension 30. The rear suspension 30 provided on a left side of the vehicle and the rear suspension provided on a right side of the vehicle are arranged in left right symmetry and have the same structure. Accordingly, in the explanation made hereinafter, the rear suspension 30 on a left side of the vehicle is explained, and the explanation of the rear suspension 30 on a right side of the vehicle is omitted.

As shown in FIG. 1, the rear wheel 20 is suspended from a vehicle body frame 10 (vehicle body) by way of an independent suspension type (double wishbone type) rear suspension 30.

The rear suspension 30 includes: an upper arm 40 (swing arm) and a lower arm 50 that have inner sides thereof in the vehicle width direction swingably supported on a vehicle body frame 10 side; a knuckle 60, which is supported on outer sides of the upper arm 40 and the lower arm 50 in the vehicle width direction and pivotally supports the rear wheel 20; a cushion unit 70, which is interposed between the upper arm 40 and the vehicle body frame 10; and a stabilizer 80, which suppresses the difference in vertical movement between the left and right rear wheels 20.

For example, the vehicle body frame 10 is formed of an integral body that is formed by joining plural kinds of steel members by welding or the like. The vehicle body frame 10 includes: a lower frame 11, which extends in the longitudinal direction at a lower portion of the vehicle; an upper frame 12 (see FIG. 3), which extends in the longitudinal direction above the lower frame 11; a cross frame 13, which extends between the upper frame 12 and the lower frame 11 in the vertical direction; a front frame 14 (see FIG. 2), which extends between the cross frame 13 and the upper frame 12 on a front upper side of the cross frame 13; a rear frame 15, which extends between the cross frame 13 and the upper frame 12 on a rear lower side of the cross frame 13; and an upper cross frame 16 (see FIG. 3), which extends between inner sides of the left and right upper frames 12 in the vehicle width direction.

The cross frame 13 extends in an inclined manner such that the more rearward the cross frame 13 extends, the more upward the cross frame 13 is positioned as viewed in a side view in FIG. 2, and the cross frame 13 reaches a joint portion 12a with the upper frame 12 as viewed in a top plan view in FIG. 3. The rear frame 15 gently extends obliquely in the rearward and downward direction from a rear lower side of the cross frame 13 as viewed in a side view in FIG. 2 and, thereafter, extends obliquely in the frontward and upward direction in a bent manner, and reaches the joint portion 12a with the upper frame 12 as viewed in a top plan view in FIG. 3.

The upper arm 40 is arranged in a state where the upper arm 40 is gently inclined such that the more rearward the upper arm 40 extends, the more downward the upper arm 40 is positioned as viewed in a side view in FIG. 2, and the upper arm 40 is also gently inclined such that the more outward the upper arm 40 extends in the vehicle width direction, the more downward the upper arm 40 is positioned as viewed in a front view in FIG. 4.

The lower arm 50 is also arranged in a state where the lower arm 50 is gently inclined such that the more rearward the lower arm 50 extends, the more downward the lower arm 50 is positioned as viewed in a side view in FIG. 2, and the lower frame 50 is also gently inclined such that the more outward the lower arm 50 extends in the vehicle width direction, the more downward the lower arm 50 is positioned as viewed in a front view in FIG. 4.

As shown in FIG. 1, a drive shaft 62, which extends from a final reduction gear 61, is rotatably supported on the knuckle 60. An outer end portion of the drive shaft 62 in the vehicle width direction is inserted into a through hole (not shown in the drawing) formed in the knuckle 60 and projects to the outside in the vehicle width direction from the knuckle 60. A hub 21 of the rear wheel 20 is connected to the outer end portion of the drive shaft 62 in the vehicle width direction. With such a configuration, a drive force of a power unit including an engine is transmitted to the rear wheel 20 through a rear propeller shaft (none of the engine, the power unit and the rear propeller shaft shown in the drawing), the final reduction gear 61, the drive shaft 62 and the hub 21.

The cushion unit 70 includes: a rod-type damper; and a coil spring, which is wound around the periphery of the damper, for example, and acquires a predetermined buffer action by extending and shrinking along a center axis (stroke axis) C1 of the cushion unit 70. The cushion unit 70 is arranged in a state where the cushion unit 70 is inclined such that the more outward the stroke axis C1 extends in the vehicle width direction, the more frontward the stroke axis C1 is positioned as viewed in a top plan view in FIG. 3, and the cushion unit 70 is arranged in an inclined such that the more inward the stroke axis C1 extends in the vehicle width direction, the more upward the stroke axis C1 is positioned as viewed in a front view in FIG. 4.

As shown in FIG. 3, an upper end portion 70a of the cushion unit 70 is pivotally supported on a cushion upper support portion 16a, which is formed on an outer end side of the upper cross frame 16 of the vehicle body frame 10 in the vehicle width direction. The cushion upper support portion 16a includes an extending portion 16b, which expands in an enlarging manner in the longitudinal direction as the cushion upper support portion 16a extends toward an upper frame 12 side. The extending portion 16b of the cushion upper support portion 16a is joined to the upper frame 12. The joint portion 12a between the extending portion 16b of the cushion upper support portion 16a and the upper frame 12 is arranged so as to overlap with an upper end portion 13a of the cross frame 13 and an upper end portion 15a of the rear frame 15 as viewed in a top plan view in FIG. 3. With such a configuration, the upper frame 12, the upper end portion 13a of the cross frame 13, and the upper end portion 15a of the rear frame 15 are made to function as reinforcing members of the cushion upper support portion 16a and hence, the cushion upper support portion 16a can be efficiently reinforced.

As shown in FIG. 2, a lower end portion 70b of the cushion unit 70 is pivotally supported on a cushion lower support portion 60a which is formed on an upper end portion of the knuckle 60. The cushion lower support portion 60a of the knuckle 60 is arranged between front and rear wheel-side support portions 42f, 42r of the upper arm 40. A bolt 90, which extends in the longitudinal direction from the front wheel-side support portion 42f to the rear wheel-side support portion 42r of the upper arm 40, is made to pass through the lower end portion 70b and the cushion lower support portion 60a, and the bolt 90 is brought into slide contact with inner peripheral surfaces of front and rear tubular bushings 91 and a through hole (not shown in the drawing) formed in the lower end portion 70b of the cushion unit 70 with a collar or the like interposed therebetween respectively, and a nut 92 is threadedly engaged with and fastened to a threaded portion 90a, which projects rearwardly from the rear wheel-side support portion 42r. With such a configuration, the cushion lower support portion 60a of the knuckle 60 is swingably supported on the front and rear wheel-side support portions 42f, 42r of the upper arm 40.

The cushion lower support portion 60a is fastened by fastening members such as the bolt 90 and the nut 92 together with the front and rear wheel-side support portions 42f, 42r of the upper arm 40 and hence, the front and rear wheel-side support portions 42f, 42r of the upper arm 40 are made to function as reinforcing members of the cushion lower support portion 60a whereby the cushion lower support portion 60a can be efficiently reinforced.

As shown in FIG. 4, the stabilizer 80 includes: a torsion bar 81, which has a gate shape and opens obliquely in the rearward and downward direction; and a connecting rod 82, which extends between an outer end portion of the torsion bar 81 in the vehicle width direction and the upper arm 40. As shown in FIG. 2, in the torsion bar 81, both left and right end portions of a straight portion (not shown in the drawing), which extends in the vehicle width direction, are supported on gussets 84, which are joined to the cross frame 13 by welding or the like in a rotatable manner by way of a holder 83.

One end portion 82a of the connecting rod 82 is connected to an outer end portion 81a of the torsion bar 81 in the vehicle width direction by way of a ball joint or the like. The other end portion 82b of the connecting rod 82 is connected to a planar portion 45s of the vehicle-body-side cross member 45 of the upper arm 40 by way of a ball joint or the like. With such a configuration, when one rear wheel 20 moves in the vertical direction, the other rear wheel 20 also performs the similar vertical movement by way of the torsion bar 81 and hence, the difference in vertical movement between the left and right rear wheels 20 can be suppressed.

In FIG. 1 to FIG. 4, symbol 18 indicates a gusset, which is joined to the cross frame 13 and the rear frame 15 by welding or the like and swingably supports the front vehicle-body-side support portion 41f of the upper arm 40 by way of a fastening member, such as a bolt. Symbol 19 indicates a gusset, which is joined to the rear frame 15 by welding or the like and swingably supports the rear vehicle-body-side support portion 41r of the upper arm 40 by way of a fastening member, such as a bolt. Symbol 51 indicates a bracket, which is joined to the lower frame 11 and swingably supports an inner side of the lower arm 50 in the vehicle width direction by way of a fastening member, such as a bolt. Symbol 60b indicates a lower end portion of the knuckle 60, which swingably supports an outer side of the lower arm 50 in the vehicle width direction by way of a fastening member 93, such as a bolt.

Next, the configuration of the upper arm 40 is explained by reference to FIG. 5 to FIG. 10.

Figure 5:
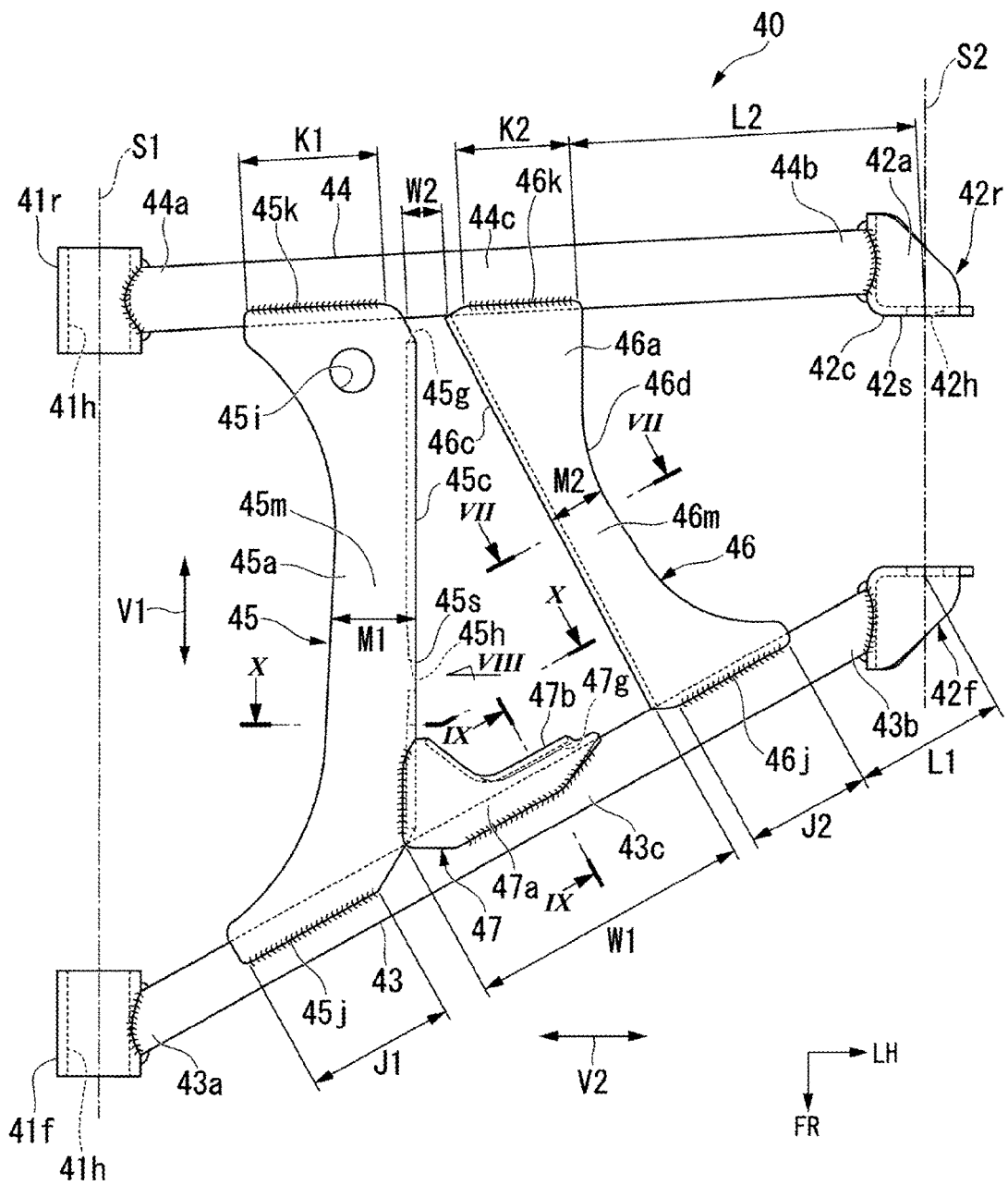
FIG. 5 is a top plan view of an upper arm which constitutes the rear suspension.
Figure 6:
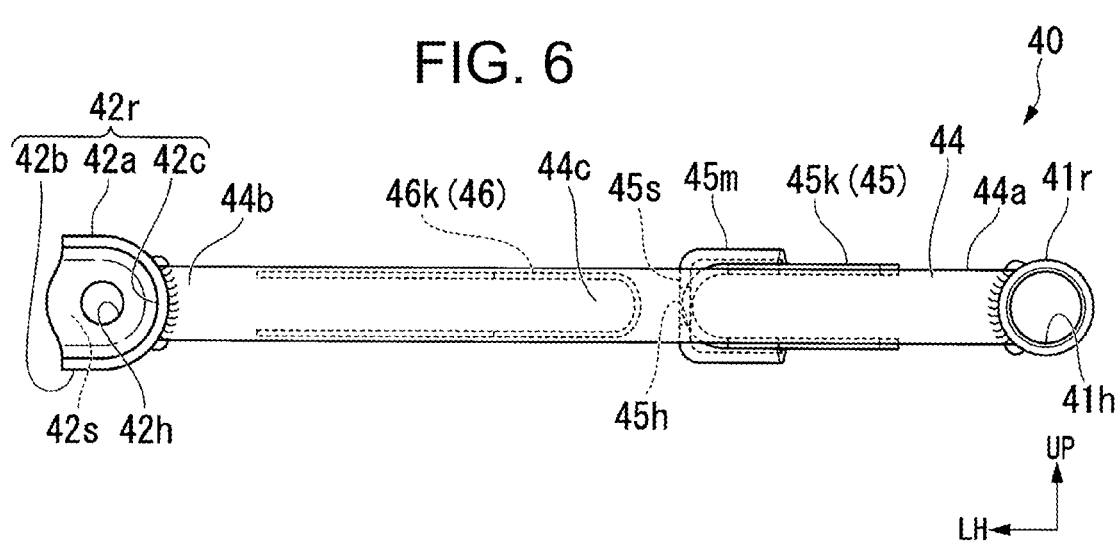
FIG. 6 is a rear view of the upper arm.
Figure 7:
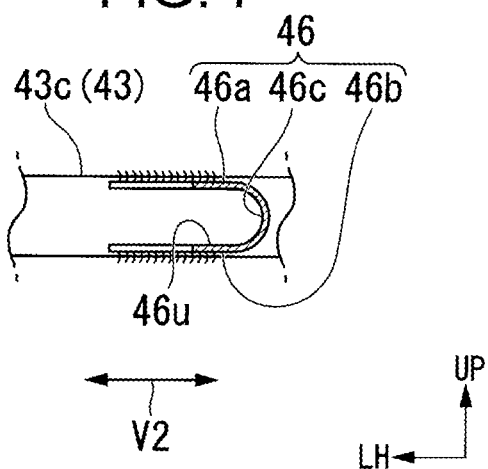
FIG. 7 is a cross-sectional view taken along a line VII-VII in FIG. 5.
Figure 8:
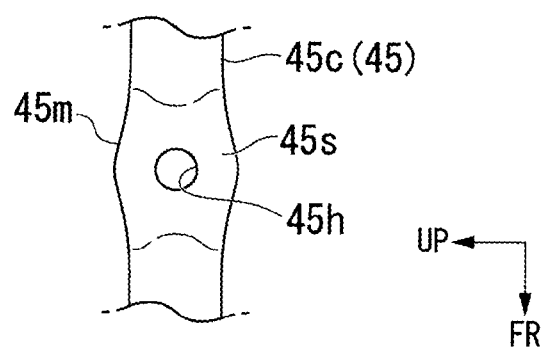
FIG. 8 is a view as viewed in the direction indicated by an arrow VIII in FIG. 5.
Figure 9:
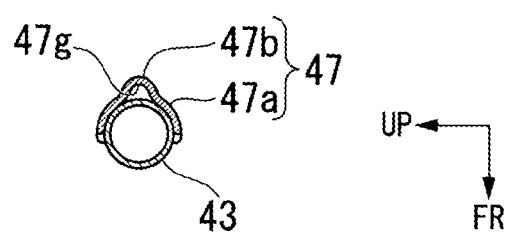
FIG. 9 is a cross-sectional view taken along a line IX-IX in FIG. 5.
Figure 10:
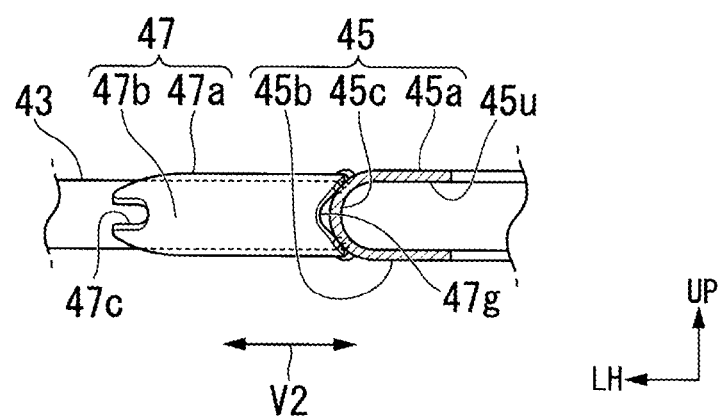
FIG. 10 is a cross-sectional view taken along a line X in FIG. 5.

FIG. 5 is a top plan view of the upper arm 40, which constitutes the above-mentioned rear suspension 30. FIG. 6 is a rear view of the above-mentioned upper arm 40. FIG. 7 is a cross-sectional view taken along a line VII-VII in FIG. 5. FIG. 8 is a view as viewed in the direction indicated by an arrow VIII in FIG. 5. FIG. 9 is a cross-sectional view taken along a line IX-IX in FIG. 5. FIG. 10 is a cross-sectional view taken along a line X in FIG. 5.

As shown in FIG. 5, the upper arm 40 has a ladder shape extending in the vehicle width direction such that the more outside the upper arm 40 extends in the vehicle width direction, the narrower a width of the upper arm 40 in the longitudinal direction becomes. For example, the upper arm 40 is formed of an integral body, which is formed by joining plural kinds of steel members by welding or the like.

The upper arm 40 includes: the pair of front and rear vehicle-body-side support portions 41f, 41r, which is supported on the vehicle body frame 10 (see FIG. 1) side by way of a first rotary shaft S1; the pair of front and rear wheel-side support portions 42f, 42r, which is supported on a rear wheel 20 (see FIG. 1) side by way of a second rotary shaft S2; the pair of front and rear arm portions 43, 44, which is arranged in the longitudinal direction so as to connect the front and rear vehicle-body-side support portions 41f, 41r and the front and rear wheel-side support portions 42f, 42r to each other respectively; the vehicle-body-side cross member 45, which extends in the longitudinal direction between the pair of front and rear arm portions 43, 44 and is arranged on a vehicle body frame 10 side; a wheel-side cross member 46, which extends in the longitudinal direction between the pair of front and rear arm portions 43, 44 and is arranged on a rear wheel 20 side; and a gusset 47, which connects the front arm portion 43 and the vehicle-body-side cross member 45 to each other. Hereinafter, an axial direction (longitudinal direction) of the first rotary shaft S1 is assumed as a first direction V1, and the direction that the upper arm 40 extends (the vehicle width direction that the front and rear arm portions 43, 44 extend) is assumed as a second direction V2.

The front and rear vehicle-body-side support portions 41f, 41r are formed into a cylindrical shape where each support portions 41f, 41r has a through hole 41h opening in the longitudinal direction and having a circular shape as viewed in a rear view in FIG. 6. The front vehicle-body-side support portion 41f is swingably supported on the gusset 18 (see FIG. 1) by making a fastening member such as a bolt pass through the through hole 41h. The rear vehicle-body-side support portion 41r is swingably supported on the gusset 19 (see FIG. 1) by making a fastening member such as a bolt pass through the through hole 41h.

The front and rear vehicle-body-side support portions 41f, 41r are formed into the same shape using the same material. Accordingly, the same parts can be used in common for forming the front and rear vehicle-body-side support portions 41f, 41r in the upper arm 40 and hence, the number of parts can be reduced and a manufacturing cost can be reduced.

As shown in FIG. 6, the front and rear wheel-side support portions 42f, 42r respectively have: an upper wall 42a and a lower wall 42b, which have a triangular shape as viewed in a top plan view in FIG. 5; and a vertical wall 42c, which extends between the upper wall 42a and the lower wall 42b. A flat planar portion 42s is formed on the vertical wall 42c. A through hole 42h, which has a circular shape as viewed in a rear view in FIG. 6 and opens frontward and rearward is formed in the planar portion 42s. The front and rear wheel-side support portions 42f, 42r swingably support the cushion lower support portion 60a of the knuckle 60 shown in FIG. 1 by making a fastening member, such as a bolt pass, through the through holes 42h. For example, the front and rear wheel-side support portions 42f, 42r are respectively formed of an integral body by pressing.

The front and rear wheel-side support portions 42f, 42r are formed into the same shape using the same material. Accordingly, the same parts can be used in common for forming the front and rear wheel-body-side support portions 42f, 42r in the upper arm 40 and hence, the number of parts can be reduced and a manufacturing cost can be reduced.

The front and rear arm portions 43, 44 are respectively formed of a cylindrical steel pipe.

The front arm portion 43 straightly extends in an inclined manner from a first end portion 43a, which is joined to the front vehicle-body-side support portion 41f by welding or the like such that the more outward the front arm portion 43 extends in the vehicle width direction, the more rearward the front arm portion 43 is positioned as viewed in a top plan view in FIG. 5 and, thereafter, reaches a second end portion 43b, which is joined to the front wheel-side support portion 42f by welding or the like.

The rear arm portion 44 straightly and gently extends in an inclined manner from a first end portion 44a which is joined to the rear vehicle-body-side support portion 41r by welding or the like such that the more outward the rear arm portion 44 extends in the vehicle width direction, the more rearward the rear arm portion 44 is positioned as viewed in a top plan view in FIG. 5 and, thereafter, reaches a second end portion 44b, which is joined to the rear wheel-side support portion 42r by welding or the like.

The vehicle-body-side cross member 45 extends rearward from a first connecting portion 45j, which is joined to the front arm portion 43 by welding or the like, reaches an intermediate portion 45m positioned in a middle between the front and rear arm portions 43, 44 and, thereafter, extends rearward and reaches a second connecting portion 45k, which is joined to the rear arm portion 44 by welding or the like.

In the vehicle-body-side cross member 45, a width J1 of the first connecting portion 45j and a width K1 of the second connecting portion 45k are larger than a width M1 of the intermediate portion 45m (J1>M1, K1>M1). Here, the width J1 of the first connecting portion 45j means a length of a weld between the first connecting portion 45j and the front arm portion 43 shown in FIG. 5. The width K1 of the second connecting portion 45k means a length of a weld between the second connecting portion 45k and the rear arm portion 44 shown in FIG. 5. The width M1 of the intermediate portion 45m means a length of the intermediate portion 45m in the direction orthogonal to the direction that the vehicle-body-side cross member 45 extends as viewed in a top plan view in FIG. 5.

The vehicle-body-side cross member 45 is formed by bending a plate material. The vehicle-body-side cross member 45 has a U shape in cross section in FIG. 10, and forms an opening portion 45u, which opens so as to face the inside in the vehicle width direction in the second direction V2.

The vehicle-body-side cross member 45 may be formed into a C shape in cross section in FIG. 10, or may be formed into a shape that opens so as to face the outside in the vehicle width direction in the second direction V2.

As shown in FIG. 10, the vehicle-body-side cross member 45 has: an upper wall 45a and a lower wall 45b, which project inward in the vehicle width direction in the second direction V2; and a vertical wall 45c, which extends between the upper wall 45a and the lower wall 45b. As shown in FIG. 8, a flat planar portion 45s is formed on the vertical wall 45c. The planar portion 45s is formed such that the intermediate portion 45m projects more upward and more downward than front and rear peripheral portions respectively. A through hole 45h (a mounting portion for mounting a chassis-group member), which opens in the vehicle width direction and has a circular shape as viewed in the direction of FIG. 8, is formed in the planar portion 45s. The other end portion 82b of the connecting rod 82, which constitutes the stabilizer 80 shown in FIG. 1, is mounted on the planar portion 45s by making a joint portion such as a ball joint pass through the through hole 45h.

The member to be mounted in the through hole 45h is not limited to the stabilizer 80, and a chassis-group member such as a member of a brake system, a member of a suspension system or a member of a steering system may be mounted in the through hole 45h.

As shown in FIG. 5, in a portion of the vehicle-body-side cross member 45 close to the second connecting portion 45k, a through hole 45i opening upwardly and downwardly and having a circular shape as viewed in a top plan view in FIG. 5 is formed. A portion of the vehicle-body-side cross member 45 close to the vertical wall 45c of the second connecting portion 45k forms a gap 45g between the portion and the rear arm portion 44. With such a configuration, even when water, mud or the like enters through the opening portion 45u (see FIG. 10) of the vehicle-body-side cross member 45, water, mud or the like can be discharged to the outside through the through hole 45i and the gap 45g. Accordingly, it is possible to suppress water, mud or the like from being stagnated inside the vehicle-body-side cross member 45.

As shown in FIG. 5, the wheel-side cross member 46 extends in an inclined manner from a first connecting portion 46j, which is joined to the front arm portion 43 by welding or the like, such that the more rearward the wheel-side cross member 46 extends, the more inward the wheel-side cross member 46 is positioned in the vehicle width direction, reaches an intermediate portion 46m positioned in a middle between the front and rear arm portions 43, 44 and, thereafter, obliquely extends in the same manner as described above, and reaches a second connecting portion 46k, which is joined to the rear arm portion 44 by welding or the like.

In the wheel-side cross member 46, a width J2 of the first connecting portion 46j and a width K2 of the second connecting portion 46k are larger than a width M2 of the intermediate portion 46m (J2>M2, K2>M2). Here, the width J2 of the first connecting portion 46j means a length of a weld between the first connecting portion 46j and the front arm portion 43 shown in FIG. 5. The width K2 of the second connecting portion 46k means a length of a weld between the second connecting portion 46k and the rear arm portion 44 shown in FIG. 5. The width M2 of the intermediate portion 46m means a length of the intermediate portion 46m in the direction orthogonal to the direction that the wheel-side cross member 46 extends as viewed in a top plan view in FIG. 5.

The wheel-side cross member 46 is formed by bending a plate material. The wheel-side cross member 46 has a U shape in cross section in FIG. 7, and forms an opening portion 46u, which opens so as to face the outside in the vehicle width direction in the second direction V2.

The wheel-side cross member 46 may be formed into a C shape in cross section in FIG. 7, or may be formed into a shape that opens so as to face the inside in the vehicle width direction in the second direction V2.

As shown in FIG. 7, the wheel-side cross member 46 has: an upper wall 46a and a lower wall 46b, which project outward in the vehicle width direction in the second direction V2; and a vertical wall 46c, which extends between the upper wall 46a and the lower wall 46b. As shown in FIG. 5, a bent portion 46d, which has an edge thereof bent in the direction toward the vertical wall 46c is formed on the upper wall 46a and the lower wall 46b. To be more specific, the bent portion 46d is formed on the upper wall 46a and the lower wall 46b such that the bent portion 46d is indented and bent inwardly in the vehicle width direction so as to be away from the cushion unit (see FIG. 1).

As shown in FIG. 5, the first connecting portion 45j of the vehicle-body-side cross member 45 is arranged between the first end portion 43a and the intermediate portion 43c of the front arm portion 43. On the other hand, the first connecting portion 46j of the wheel-side cross member 46 is arranged between the intermediate portion 43c and the second end portion 43b of the front arm portion 43.

The second connecting portion 45k of the vehicle-body-side cross member 45 is arranged between the first end portion 44a and the intermediate portion 44c of the rear arm portion 44. On the other hand, the second connecting portion 46k of the wheel-side cross member 46 is arranged on the intermediate portion 43c of the rear arm portion 44.

As viewed in a top plan view in FIG. 5, a distance between the first connecting portion 45j of the vehicle-body-side cross member 45 and the first connecting portion 46j of the wheel-side cross member 46, which are connected to the front arm portion 43, is assumed as a front connection distance W1. As viewed in a top plan view in FIG. 5, a distance between the second connecting portion 45k of the vehicle-body-side cross member 45 and the second connecting portion 46k of the wheel-side cross member 46, which are connected to the rear arm portion 44, is assumed as a rear connection distance W2. The front connection distance W1 is larger than the rear connection distance W2 (W1>W2).

The gusset 47 is formed into an L shape as viewed in a top plan view in FIG. 5 so as to extend between a portion of the vehicle-body-side cross member 45 close to the first connecting portion 45j and the intermediate portion 43 of the front arm portion 43. As shown in FIG. 9 and FIG. 10, the gusset 47 includes: a body portion 47a, which is connected to a portion of the vehicle-body-side cross member 45 close to the first connecting portion 45j and to the intermediate portion 43m of the front arm portion 43; and a projecting portion 47b, which is bent and projects rearwardly from the body portion 47a. As shown in FIG. 10, a recessed portion 47c, which is indented inward in a U shape in the vehicle width direction, is formed on a connecting portion between the gusset 47 and the front arm portion 43.

In the gusset 47, a gap 47g is formed between the gusset 47 and the portion of the vehicle-body-side cross member 45 close to the first connecting portion 45j, and between the gusset 47 and the intermediate portion 43 of the front arm portion 43. With such a configuration, even when water, mud or the like enters the inside of the gusset 47, water, mud or the like can be discharged to the outside through the gap 47g and hence, it is possible to suppress water, mud or the like from being stagnated in the inside of the gusset 47.

As has been explained heretofore, this embodiment is directed to the upper arm 40, which includes: the vehicle-body-side support portions 41f, 41r, which are supported on the vehicle body frame 10 side by way of the first rotary shaft S1; the wheel-side support portions 42f, 42r, which are supported on the rear wheel 20 side by way of the second rotary shaft S2; and the pair of arm portions 43, 44, which connects the vehicle-body-side support portions 41f, 41r and the wheel-side support portions 42f, 42r to each other, wherein the cross members 45, 46, which extend in the axial direction V1 (first direction) of the first rotary shaft S1 are arranged on the pair of arm portions 43, 44 so as to extend between the pair of arm portions 43, 44, and the cross members 45, 46 have a U shape in cross section orthogonal to the longitudinal direction of the cross members 45, 46, thus forming the opening portions 45u, 46u that open so as to face the direction V2 (second direction) that the pair of arm portions 43, 44 extend.

With such a configuration, the cross members 45, 46, which extend in the axial direction V1 of the first rotary shaft S1, are arranged so as to extend between the pair of arm portions 43, 44, and the cross members 45, 46 have a U shape in cross section orthogonal to the longitudinal direction of the cross members 45, 46, and open so as to face the direction V2 that the pair of arm portions 43, 44 extends. Accordingly, the cross members 45, 46 can be formed into a symmetrical shape using the center line CL in the lateral direction of the vehicle body as an axis of symmetry. With such a configuration, when the upper arm 40 is arranged on both left and right sides, the same upper arm 40 can be arranged on both left and right sides respectively by reversing the same upper arm 40 inside out and hence, the upper arms 40 on both left and right sides can be formed using the same upper arm in common. Accordingly, it becomes unnecessary to prepare the left and right upper arms 40 separately, thus reducing the number of parts and realizing the reduction of a manufacturing cost.

Further, by forming the bent portion 46d, which has the edge thereof bent in the direction toward the vertical wall 46c on the upper wall 46a and the lower wall 46b of the wheel-side cross member 46, it is possible to easily form an escape portion for a suspension-group member. For example, the bent portion 46d functions as an escape portion for the cushion unit 70, thus preventing the wheel-side cross member 46 and the cushion unit 70 from being brought into contact with each other.

Further, by forming the wheel-side cross member 46 by bending a plate material, the bent portion 46d can be formed by punching the plate material and hence, compared to a case where the wheel-side cross member 46 is formed by bending a pipe member, man-hours for working can be reduced and a manufacturing cost can be reduced. Further, by forming the flat planar portion 45s on the vertical wall 45c of the vehicle-body-side cross member 45, and by forming the mounting portion 45h for a chassis-group member on the planar portion 45s, it becomes unnecessary to additionally provide a bracket or the like for mounting the chassis-group member and hence, the number of parts can be reduced and a manufacturing cost can be reduced. The chassis-group member may be a member of a brake system, a member of a suspension system or a member of a steering system.

Further, by setting widths J1, K1, J2, K2 of the connecting portions 45j, 45k, 46j, 46k of the cross members 45, 46 larger than the widths M1, M2 of the intermediate portions 45m, 46m of the cross member 45, 46, connection margins of the connecting portions 45j, 45k, 46j, 46k with respect to the pair of arm portions 43, 44 can be sufficiently secured and hence, the cross members 45, 46 can be firmly connected to the pair of arm portions 43, 44 whereby it becomes unnecessary to additionally provide a gusset or the like for securing the connection margin. Accordingly, the number of parts can be reduced and a manufacturing cost can be reduced.

Further, the front connection distance W1 between the vehicle-body-side cross member 45 and the wheel-side cross member 46, which are connected to the front arm portion 43 is set larger than the rear connection distance W2 between the vehicle-body-side cross member 45 and the wheel-side cross member 46, which are connected to the rear arm portion 44. Accordingly, as shown in FIG. 5, the length L2 from the connecting portion of the rear arm portion 44 with the wheel-side cross member 46 to the rear wheel-side support portion 42r can be set larger than the length L1 from the connecting portion of the front arm portion 43 with the wheel-side cross member 46 to the front wheel-side support portion 42f and hence, the rear arm portion 44 can be deflected while enhancing rigidity of the front arm portion 43.

Further, the mounting portion 45h for the chassis-group member is formed of the through hole to which the stabilizer 80 is mounted. Accordingly, it becomes unnecessary to additionally provide a bracket or the like for mounting the stabilizer 80 and hence, the number of parts can be reduced and a manufacturing cost can be reduced.

In the above-mentioned embodiment, the explanation has been made by exemplifying the case where the cross members 45, 46 extending in the first direction V1 (longitudinal direction) are arranged so as to extend between the pair of arm portions 43, 44 extending in the vehicle width direction, and the cross members 45, 46 are formed into a U shape in cross section orthogonal to the longitudinal direction of the cross members 45, 46, and open so as to face the second direction V2 that the pair of arm portions 43, 44 extend. However, the invention is not limited to the above-mentioned embodiment. For example, a cross member extending in the first direction (vehicle width direction) may be arranged so as to extend between a pair of arm portions extending in the longitudinal direction, and the cross member may be formed into a U shape in cross section orthogo-nal to the longitudinal direction of the cross member, and may open so as to face the second direction (longitudinal direction). That is, a cross member extending in the axial direction (first direction) of the first rotary shaft may be arranged so as to extend between the pair of arm portions, the cross member may be formed into a U shape in cross section orthogonal to the longitudinal direction of the cross member, and may open so as to face the direction (second direction) that the pair of arm portions extends.

The invention is not limited to the above-mentioned embodiment, and is applicable not only to the above-mentioned four-wheeled vehicle but also to various types of vehicles such as a motorcycle and a three-wheeled vehicle.

Further, the configuration described in the above-mentioned embodiment is merely one example of the invention, and various modifications such as the replacement of constitutional elements of the embodiment with well-known constitutional elements are conceivable without departing from the gist of the invention.

DESCRIPTION OF REFERENCE NUMERALS AND SIGNS

10: vehicle body frame (vehicle body)
20: rear wheel (wheel)
41f: front vehicle-body-side support portion
41r: rear vehicle-body-side support portion
42f: front wheel-side support portion
42r: rear wheel-side support portion
43: front arm portion
44: rear arm portion
45: vehicle-body-side cross member
45a: upper wall
45b: lower wall
45c: vertical wall
45h: through hole (mounting portion for chassis-group member)
45j: first connecting portion (connecting portion)
45k: second connecting portion (connecting portion)
45m: intermediate portion
45s: planar portion
45u: opening portion
46: wheel-side cross member
46a: upper wall
46b: lower wall
46c: vertical wall
46d: bent portion
46j: first connecting portion (connecting portion)
46k: second connecting portion (connecting portion)
46m: intermediate portion
46u: opening portion
80: stabilizer
J1: width of first connecting portion of vehicle-body-side cross member (width of connecting portion)
J2: width of first connecting portion of wheel-side cross member (width of connecting portion)
K1: width of second connecting portion of vehicle-body-side cross member (width of connecting portion)
K2: width of second connecting portion of wheel-side cross member (width of connecting portion)
M1: width of intermediate portion of vehicle-body-side cross member (width of intermediate portion)
M2: width of intermediate portion of wheel-side cross member (width of intermediate portion)
S1: first rotary shaft
S2: second rotary shaft
V1: axial direction of first rotary shaft V2: longitudinal direction of cross member
W1: front connection distance
W2: rear connection distance

What is claimed is:

1. A swing arm comprising:
a vehicle-body-side support portion that is supported on a vehicle body side by a first rotary shaft;
a wheel-side support portion that is supported on a wheel side by a second rotary shaft; and
a pair of arm portions that connect the vehicle-body-side support portion and the wheel-side support portion to each other, wherein
a cross member that extends in an axial direction of the first rotary shaft is arranged on the pair of arm portions so as to extend between the pair of arm portions, and
the cross member has a U shape in cross section orthogonal to a longitudinal direction of the cross member thus forming an opening portion that opens so as to face a direction that the pair of arm portions extends,
wherein the cross member includes an upper wall and a lower wall that project in the direction that the pair of arm portions extends, and a vertical wall that extends between the upper wall and the lower wall,
wherein the cross member is formed by bending a plate material, a flat planar portion is formed on the vertical wall, and a mounting portion for mounting a chassis-group member is formed on the planar portion.

2. The swing arm according to claim 1, wherein the cross member has: connecting portions that are connected to the pair of arm portions, and an intermediate portion that is positioned in a middle between the pair of arm portions, and
in the cross member, widths of the connecting portions are larger than widths of the intermediate portions.

3. The swing arm according to claim 1, wherein the pair of arm portions is constituted of a front arm portion and a rear arm portion, which are arranged in the longitudinal direction,
the cross member is constituted of a vehicle-body-side cross member, which is arranged on the vehicle body side, and a wheel-side cross member, which is arranged on the wheel side, and
a front connection distance between the vehicle-body-side cross member and the wheel-side cross member, which are connected to the front arm portion, is larger than a rear connection distance between the vehicle-body-side cross member and the wheel-side cross member, which are connected to the rear arm portion.

4. A swing arm comprising:
a vehicle-body-side support portion that is supported on a vehicle body side by a first rotary shaft;
a wheel-side support portion that is supported on a wheel side by a second rotary shaft; and
a pair of arm portions that connect the vehicle-body-side support portion and the wheel-side support portion to each other, wherein
a cross member that extends in an axial direction of the first rotary shaft is arranged on the pair of arm portions so as to extend between the pair of arm portions, and
the cross member has a U shape in cross section orthogonal to a longitudinal direction of the cross member thus forming an opening portion that opens so as to face a direction that the pair of arm portions extends,
wherein the cross member includes:
an upper wall and a lower wall that project in the direction that the pair of arm portions extends;
a vertical wall that extends between the upper wall and the lower wall; and
a bent portion that has an edge thereof bent toward the vertical wall is formed on the upper wall and the lower wall,
wherein the cross member is formed by bending a plate material,
a flat planar portion is formed on the vertical wall, and
a mounting portion for mounting a chassis-group member is formed on the planar portion.

5. The swing arm according to claim 4, wherein the pair of arm portions is constituted of a front arm portion and a rear arm portion, which are arranged in the longitudinal direction,
the cross member is constituted of a vehicle-body-side cross member, which is arranged on the vehicle body side and a wheel-side cross member, which is arranged on the wheel side, and
a front connection distance between the vehicle-body-side cross member and the wheel-side cross member, which are connected to the front arm portion, is larger than a rear connection distance between the vehicle-body-side cross member and the wheel-side cross member, which are connected to the rear arm portion.

6. The swing arm according to claim 4, wherein the chassis-group member is a stabilizer, and the mounting portion for the chassis-group member is a through hole to which the stabilizer is mounted.

7. The swing arm according to claim 4, wherein the cross member has: connecting portions that are connected to the pair of arm portions, and an intermediate portion that is positioned in a middle between the pair of arm portions, and
in the cross member, widths of the connecting portions are larger than widths of the intermediate portions.

8. The swing arm according to claim 7, wherein the pair of arm portions is constituted of a front arm portion and a rear arm portion, which are arranged in the longitudinal direction,
the cross member is constituted of a vehicle-body-side cross member, which is arranged on the vehicle body side, and a wheel-side cross member, which is arranged on the wheel side, and
a front connection distance between the vehicle-body-side cross member and the wheel-side cross member, which are connected to the front arm portion, is larger than a rear connection distance between the vehicle-body-side cross member and the wheel-side cross member, which are connected to the rear arm portion.

9. A swing arm comprising:
a vehicle-body-side support portion that is supported on a vehicle body side by a first rotary shaft;
a wheel-side support portion that is supported on a wheel side by a second rotary shaft; and
a pair of arm portions that connect the vehicle-body-side support portion and the wheel-side support portion to each other, wherein
a cross member that extends in an axial direction of the first rotary shaft is arranged on the pair of arm portions so as to extend between the pair of arm portions, and
the cross member has a U shape in cross section orthogonal to a longitudinal direction of the cross member thus forming an opening portion that opens so as to face a direction that the pair of arm portions extends,
wherein the pair of arm portions is constituted of a front arm portion and a rear arm portion, which are arranged in the longitudinal direction, the cross member is constituted of a vehicle-body-side cross member, which is arranged on the vehicle body side, and a wheel-side cross member, which is arranged on the wheel side, and a front connection distance between the vehicle-body-side cross member and the wheel-side cross member, which are connected to the front arm portion, is larger than a rear connection distance between the vehicle-body-side cross member and the wheel-side cross member, which are connected to the rear arm portion.

10. The swing arm according to claim 9, wherein the cross member has: connecting portions that are connected to the pair of arm portions, and an intermediate portion that is positioned in a middle between the pair of arm portions, and in the cross member, widths of the connecting portions are larger than widths of the intermediate portions.

11. The swing arm according to claim 9, wherein the cross member includes:

an upper wall and a lower wall that project in the direction that the pair of arm portions extends;

a vertical wall that extends between the upper wall and the lower wall; and a bent portion that has an edge thereof bent toward the vertical wall is formed on the upper wall and the lower wall.

12. The swing arm according to claim 11, wherein the cross member is formed by bending a plate material, a flat planar portion is formed on the vertical wall, and a mounting portion for mounting a chassis-group member is formed on the planar portion.

\* \* \* \* \*